(12) United States Patent
Plona

(10) Patent No.: US 7,909,514 B2
(45) Date of Patent: Mar. 22, 2011

(54) BEARING ARRANGEMENT FOR A ROTATING SHAFT, AND TURBINE ENGINE EQUIPPED WITH SUCH AN ARRANGEMENT

(75) Inventor: Daniel Georges Plona, Vulaines/Seine (FR)

(73) Assignee: SNECMA, Paris (FR)

( * ) Notice: Subject to any disclaimer, the term of this patent is extended or adjusted under 35 U.S.C. 154(b) by 737 days.

(21) Appl. No.: 11/877,289

(22) Filed: Oct. 23, 2007

(65) Prior Publication Data

US 2008/0226209 A1    Sep. 18, 2008

(30) Foreign Application Priority Data

Oct. 26, 2006 (FR) ...................................... 06 54570

(51) Int. Cl.
*F16C 33/60* (2006.01)
*F16C 41/00* (2006.01)
*F04D 29/04* (2006.01)

(52) U.S. Cl. .......................... 384/499; 384/624; 416/174
(58) Field of Classification Search .................. 384/503, 384/517, 518, 624, 499, 500, 501, 505, 506, 384/513; 415/229; 416/174
See application file for complete search history.

(56) References Cited

U.S. PATENT DOCUMENTS

| 3,913,993 | A | * | 10/1975 | Ernst .............................. 384/513 |
| 5,791,789 | A | | 8/1998 | Van Duyn et al. |
| 6,158,896 | A | * | 12/2000 | Zernickel et al. ............. 384/506 |
| 6,413,046 | B1 | | 7/2002 | Penn et al. |
| 6,491,497 | B1 | | 12/2002 | Allmon et al. |

FOREIGN PATENT DOCUMENTS

| EP | 1 013 896 A2 | 6/2000 |
| EP | 1 191 191 A2 | 3/2002 |
| EP | 1 199 441 A2 | 4/2002 |

* cited by examiner

*Primary Examiner* — Thomas R Hannon
*Assistant Examiner* — Phillip A Johnson
(74) *Attorney, Agent, or Firm* — Oblon, Spivak, McClelland, Maier & Neustadt, L.L.P.

(57) ABSTRACT

A bearing arrangement with rolling elements is arranged between an outer bearing race and an inner bearing race. The inner bearing race includes a first half-race fastened to the rotating shaft and a second half-race. The bearing arrangement includes a maintaining unit which maintains the two half-races together. The maintaining unit is designed to break or deform when the bearing is subjected to a misalignment or a moment above a predetermined value, so as to allow an axial displacement of the second half-race with respect to the first half-race. The invention may be applied to a bearing for a rotating shaft of a turbine engine.

16 Claims, 3 Drawing Sheets

BEARING ARRANGEMENT FOR A ROTATING SHAFT, AND TURBINE ENGINE EQUIPPED WITH SUCH AN ARRANGEMENT

BACKGROUND OF THE INVENTION AND DESCRIPTION OF THE PRIOR ART

The present invention relates to a bearing for a shaft rotating in a turbine engine. It is also aimed at a turbine engine equipped with such a bearing arrangement.

In a turbine engine, the fan is intended to accelerate the air which enters an external gas flow path and joins the normal gas flow path occupied by the compressors, the combustion chamber and, after the latter, the turbines, in order to increase the gas bypass ratio.

In the event of a blade of the fan breaking, a significant unbalance is produced on the rotating shaft, which supports the fan, and consequently significant loads are transmitted to the surrounding fixed structures, entailing the risk of impairing them rapidly. It is therefore necessary to protect these surrounding structures against damage caused by a propagation of significant forces from the rotating shaft.

It could be contemplated to reinforce the surrounding structures to prevent them from being damaged, but that would result in these structures being made heavier, a situation which is at odds with the current objectives of manufacturers.

Generally, the rotating shaft is supported by a first bearing downstream of the fan and by a second bearing downstream of the first bearing. The term "downstream" is considered in the direction of gas flow.

It is known practice to use a decoupler device generally consisting of one or more fusible elements which are designed to yield rapidly to prevent the transmission of significant forces from the rotating shaft to the fixed structures during an exceptional event such as a fan blade breaking. These fusible elements generally form part of a support of the first bearing. By virtue of the decoupling, the rotating shaft can be kept rotating about its axis, with a certain radial flexibility. In other words, it continues to rotate about its axis of inertia which is offset radially with respect to the geometric axis of the engine. After shutting down the engine and slowing down the rotor, the rotational speed stabilizes at a lower value which corresponds to the speed of advance of the aircraft until it returns to the ground.

The rotating shaft forms part of a low-pressure shaft line. Generally, the axial travel of the rotating shaft is limited by an axial stop which is situated at the first bearing.

Configurations are also encountered in which the axial stop is situated at the second bearing. This arrangement makes it possible for the first bearing used to be a roller bearing, which is well adapted to the radial loads experienced in the event of a blade breaking. In normal operation, the takeup of axial forces at the second bearing thus occurs with an advantageous saving in mass. Furthermore, after decoupling, the axial stop function is maintained at the second bearing.

However, such an arrangement, comprising a roller bearing as first bearing, has certain drawbacks. Specifically, after decoupling at the first bearing, the rotation of the rotating shaft continues in a disturbed manner, thus leading to the shaft bending at the second bearing. The second bearing is thus subjected to a significant misalignment which must be accommodated by the rolling elements. This disruptive loading at the second bearing is then transmitted to the surrounding fixed structures. Consequently, these surrounding fixed structures are at risk of being damaged. Furthermore, there is a risk of the bearing cage breaking, resulting in the disappearance of the bearing function at this point.

Document U.S. Pat. No. 6,491,497 describes an arrangement for a second bearing that strives to overcome these drawbacks. This arrangement for a second bearing comprises a pivoting element which comprises a spherical face and which is fastened to the second bearing by means of retention members. These retention members are capable of withstanding the loads of a normal operation, but they break when they are subjected to a misalignment or predetermined moment. These retention members constitute secondary fusible elements which complement the primary fusible elements situated at the support for the first bearing. The breaking of the retention members allows a slight angular displacement between the rotating shaft and the support for the second bearing. Such an arrangement for a second bearing has the beneficial effect of limiting the torque transmitted to the bearing support by the second bearing. However, the radial force passes primarily through the pivoting element. As a result, the force required to break the fusible retention members increases with the applied force and depends on the coefficient of friction, a situation which might lead to an unwanted breaking of the support of the second bearing.

SUMMARY OF THE INVENTION

The object of the invention is to provide an arrangement for a second bearing as an alternative to the prior art arrangement for a second bearing, which is designed to perform an angular decoupling function when it is subjected to a misalignment or to a moment exceeding a predetermined value.

The bearing arrangement for a shaft rotating about an axis is of the type comprising rolling elements arranged between an outer bearing race and an inner bearing race.

According to a first aspect of the invention, said inner bearing race comprises a first half-race fastened to the rotating shaft and a second half-race, and the bearing arrangement comprises maintaining means for maintaining together said two half-races, said maintaining means being designed to break or deform when the bearing is subjected to a misalignment or a moment above a predetermined value, so as to allow an axial displacement of the second half-race with respect to the first half-race.

According to a first embodiment, said maintaining means comprise a connecting annulus interposed between the two half-races and interconnecting them such that, before separation, the inner bearing race is a single unit, and said connecting annulus is designed to break under tension when the bearing is subjected to a misalignment above a predetermined value.

According to a first variant of the first embodiment, this connecting annulus is continuous. According to a second variant of the first embodiment, this connecting annulus is discontinuous.

According to a second embodiment, said two half-races are distinct from one another, and said maintaining means comprise a spacer interposed between the second half-race and an axial blocking flange, said axial blocking flange being fastened to the rotating shaft.

Preferably, said spacer takes the form of a washer having weakness zones designed to break when the bearing is subjected to a misalignment or a moment above a predetermined value.

According to a first variant of the second embodiment, the spacer comprises:

a substantially oblique annular body, a first rim extending radially inward from said body and intended to support the spacer against the second half-race, and a second rim extending radially outward from said body and intended to support the spacer against the axial blocking flange, and said intermediate body is pierced with holes separated by weakness zones.

According to this first variant of the second embodiment, said weakness zones are designed to break in tension.

According to a second variant of the second embodiment, the spacer comprises:

an annular body, first protrusions distributed angularly over said body, extending axially from a first face thereof and intended to support the spacer against the second half-race, and second protrusions distributed angularly over said body, extending axially from a second face thereof and intended to support the spacer against the axial blocking flange, and said first protrusions and said second protrusions are separated by zones of the body which constitute weakness zones.

According to this second variant of the second embodiment, said weakness zones are designed to break in bending/shear.

In a manner common to the first embodiment and to the second embodiment, the bearing arrangement according to the invention comprises a retention piece fastened to the rotating shaft and designed to retain the second half-race.

Said retention piece is a piece of revolution comprising four successive segments, in which:

the first segment is a collar for fastening the maintaining piece to the rotating shaft, the second segment is a conical body, the third segment is a support ring extending circumferentially and intended to support the second half-race radially after its axial displacement, and the fourth segment is an axial blocking flange extending radially and intended to block the second half-race axially after the axial displacement thereof.

Optionally, the bearing arrangement according to the invention comprises a rotation stop device for preventing a relative rotation of said second half-race with respect to said support ring after separation. According to one particular embodiment, said rotation stop device comprises a recess in said support ring and a projection.

Optionally, the bearing arrangement according to the invention comprises at least one elastic member for returning the second half-race toward the first half-race.

According to a second aspect, the invention relates to a turbine engine comprising at least one bearing arrangement according to the first aspect.

One advantage of the invention lies in the fact that the solution of the invention is virtually independent of the radial load applied since, contrary to the solution of the prior art, the radial load does not pass through a pivoting element but through the bearing.

Another advantage of the invention lies in the fact that the separation of the two half-races constitutes an angular decoupling which allows a significant misalignment at the bearing, and limits the forces transmitted to the support for the second bearing, and consequently to the surrounding fixed structures.

BRIEF DESCRIPTION OF THE DRAWINGS

The invention will be better understood on reading the detailed description below of specific embodiments of the invention which are provided by way of non-limiting indication and illustrated by means of the appended drawings, in which.

DESCRIPTION OF THE PREFERRED EMBODIMENTS

Figure 1:
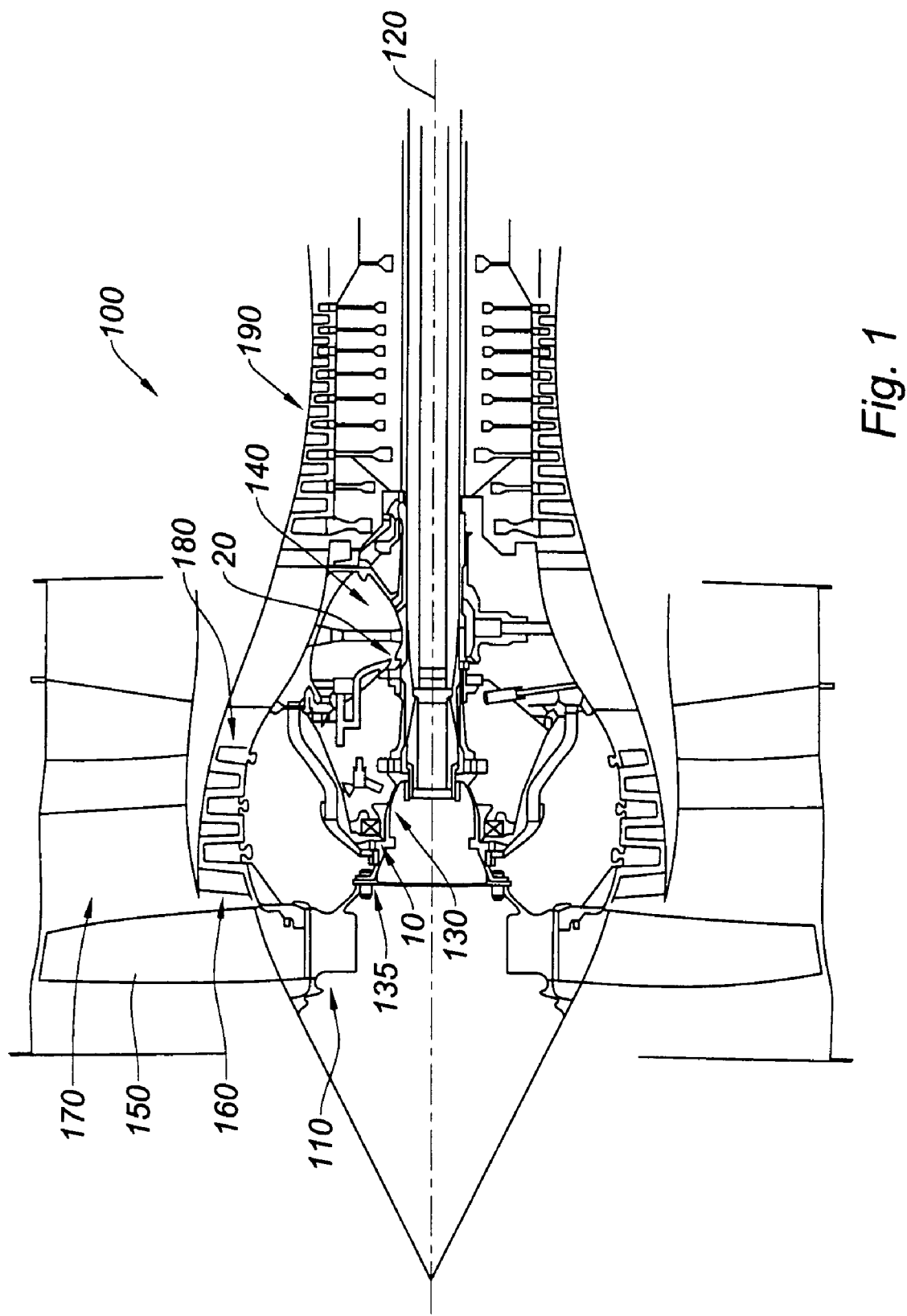
FIG. 1 illustrates, in axial section and in a simplified manner, the general environment of the invention in a turbine engine.

Referring first of all to FIG. 1, there is represented a turbine engine 100 comprising a fan 110 of axis 120 which is driven and supported by a rotating shaft 130 of a low-pressure shaft line 140. The fan 110 is provided with blades 150 which extend in front of the inlet of an internal air flow path 160 or main air flow path and in front of the inlet of an external flow path 170, surrounding the internal flow path 160, in which the air providing the thrust of the turbine engine flows. A low-pressure compressor 180 and a high-pressure compressor 190 are situated in the internal flow path 160. The rotating shaft 130 bears the fan 110 at its front end 135 and extends downstream from the fan 110. The rotating shaft 130 is supported by a first bearing 10 downstream of the fan 110 and by a second bearing 20 downstream of the first bearing 10.

Figure 2:
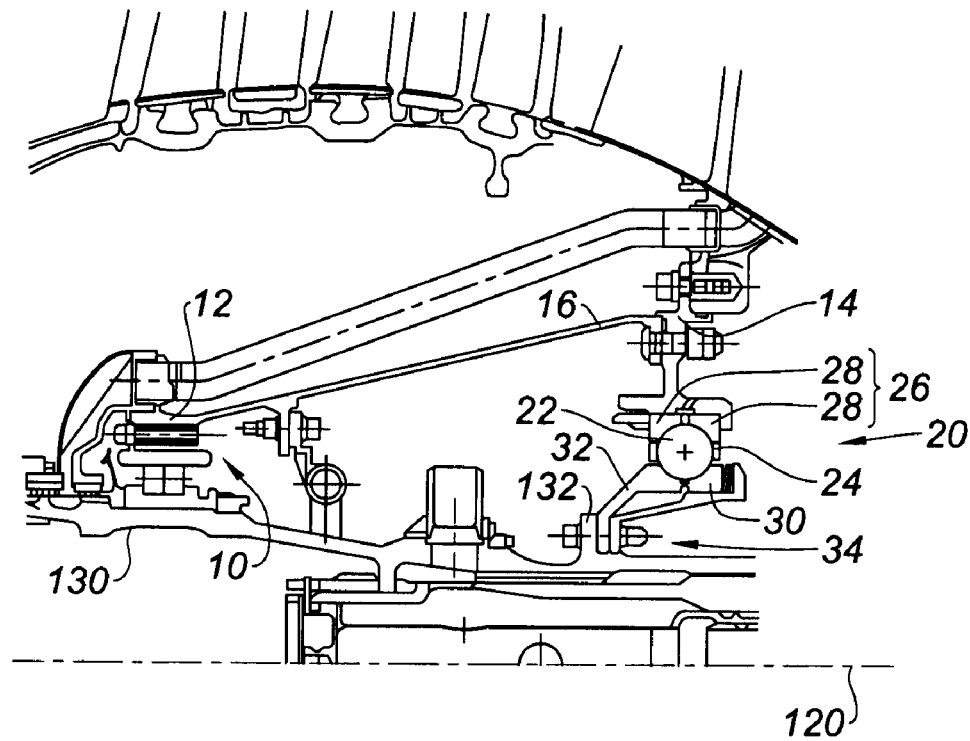
FIG. 2 illustrates, in axial section and on a larger scale, a turbine engine portion showing the first embodiment of the invention in its immediate environment.

Referring to FIG. 2, the rotating shaft 130 of axis 120 is represented on a larger scale, this shaft being supported by the first bearing 10 and by the second bearing 20.

The first bearing 10 is a roller bearing whose outer bearing race 12 is connected to a fixed structural part 14 of the turbine engine by a fusible flange 16 designed to break when it is subjected to a load exceeding a predetermined load value.

The second bearing 20 is a thrust bearing, performing an axial stop function for the rotating shaft 130. It comprises rolling elements 22 retained by means of a bearing cage 24 and arranged between an outer bearing race 26 and an inner bearing race 30.

The outer bearing race 26 is fastened to the fixed structural part 14. It consists of two half-races 28. In an equivalent variant, the outer bearing race 26 can consist of a single unit. The inner bearing race 30 is provided with a race extension 32 which is fastened to a fastening collar 132 of the rotating shaft 130. In the example illustrated, this fastening is achieved by means of a bolted connection 34.

The arrangement of the second bearing according to the invention is illustrated more fully in FIGS. 3 to 4 and 5 to 7, which describe a first embodiment and a second embodiment thereof, respectively.

Figure 3:
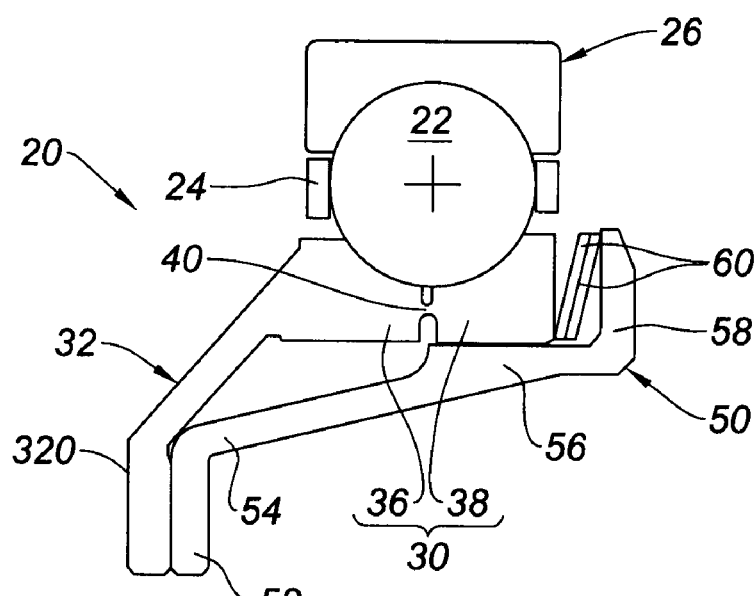
FIG. 3 represents, in axial section, a bearing arrangement according to the first embodiment of the invention.
Figure 4:
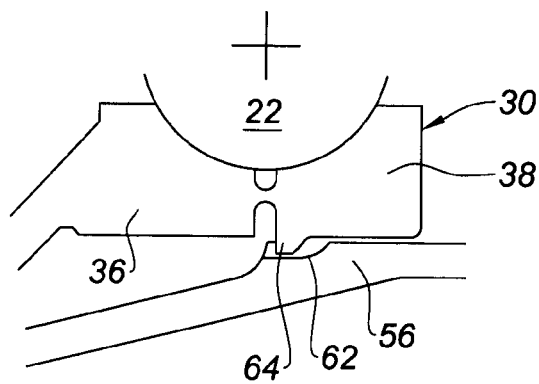
FIG. 4 is a view on a larger scale showing the rotation stop device of the bearing arrangement according to the invention.

A first embodiment of the second bearing 20 is illustrated in FIGS. 3 and 4. In FIG. 3, the second bearing 20 is represented in isolation from its environment and on a larger scale than in FIG. 2. FIG. 3 shows, in axial section, the rolling elements 22, the bearing cage 24, the outer bearing race 26, formed as a single unit, the inner bearing race 30 and its race extension 32.

According to this first embodiment, the inner bearing race 30 comprises a first half-race 36 and a second half-race 38 which are interconnected by a connecting annulus 40. This connecting annulus 40 can be continuous. In a variant, it can be discontinuous to allow the bearing to be lubricated. Owing to this rigid connection between the two half-races 36, 38, the inner bearing race 30 is formed as a single unit. The width of the connecting annulus 40 defines two grooves respectively situated on an inner face and on an outer face of the inner bearing race 30. The connecting annulus 40 constitutes a weakness zone for the inner bearing race 30.

The first half-race 36 is prolonged radially inward by an extension 32 which terminates in a fastening collar 320 intended to fasten it to the fastening collar 132 of the rotating shaft 130 by means of the bolted connection 34 described already (see FIG. 2).

The bearing arrangement 20 also comprises a retention piece 50 which takes the form of a piece of revolution comprising four successive segments. The first segment is a fastening collar 52 for fastening said retention piece 50 to the rotating shaft 130. In the example illustrated, this fastening is performed on the fastening collar 132 of the rotating shaft 130 by means of the bolted connection 34 described already. The second segment is a conical body 54 which provides the transition between the first segment and the third segment. The third segment is a support ring 56 intended to support the second half-race 38 after decoupling of the bearing, a clearance being provided in normal operation. The fourth segment is an axial blocking flange 58 which extends radially outward from the support ring 56, the function of which flange will be described below.

Optionally, the bearing arrangement 20 also comprises an elastic member 60, the function of which will be described below.

The way in which the bearing arrangement 20 according to the invention operates is as follows. In normal operation, the two half-races 36, 38 are joined to one another and constitute the inner bearing race 30 on which the rolling elements 22 roll. There may occur an exceptional event, for example the breaking of a blade 150 of the fan 110, which causes an unbalance and a disruption of the rotation of the rotating shaft 130. In such a case, provision is made for decoupling at the first bearing 10. This decoupling has the effect of disrupting the rotation of the rotating shaft 130, which starts to bend. The second bearing 20 then operates while being subjected to a substantial radial load, which causes a misalignment at this second bearing 20.

When the misalignment or the moment imposed on the second bearing 20 becomes greater than a predetermined value, the connecting annulus 40 yields under tension, and the two half-races 36, 38 become separated from one another. The first half-race 36, which is fastened to the rotating shaft 130, is not affected by this separation. By contrast, the second half-race 38 is free to be displaced axially and moves away from the first half-race 36 while remaining supported by the support ring 56, with a radial clearance. This axial displacement is limited. Specifically, the axial blocking flange 58 constitutes an axial stop for the second half-race 38. The interposed elastic member 60 serves to damp the arrival of the second half-race 38 against the axial blocking flange 58, and even to return the second half-race 38 toward the first half-race 36 when the applied loads have been reduced, thus making it possible to ensure the windmilling phase, that is to say the return-to-ground phase of the aircraft. In the example illustrated, the elastic member consists of two spring washers 60.

In the exemplary embodiment illustrated in the figures, provision is made, after separation, for the second half-race 38 not to be free to rotate with respect to the support ring 56. Specifically, the bearing arrangement 20 is provided with a rotation stop device 62, 64, which is illustrated in FIG. 4. This rotation stop device comprises a recess 62 in the radially outer face of the support ring 56, and a projection 64 which extends inward from the radially outer face of the second half-race 38. The recess 62 is dimensioned so as to allow the axial displacement of the second half-race 38 after separation of the two half-races 36, 38.

The separation of the two half-races 36, 38 constitutes an angular decoupling at the second bearing 20. After separation of the two half-races 36, 38, the axial clearance between them is increased. The effect of this is to increase the radial clearance in the second bearing 20, and hence to compensate for the misalignment caused by a bending of the rotating shaft 130 during its rotation. This increase in the radial clearance makes it possible to limit the torque transmitted to the surrounding fixed structures, and hence to protect these structures during an exceptional event such as a blade breaking, at least during the windmilling phase.

Figure 5:
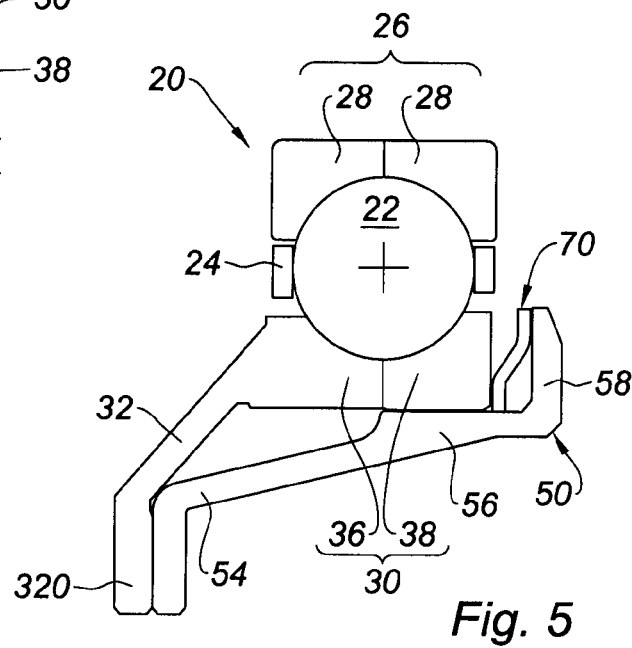
FIG. 5 represents, in axial section, a bearing arrangement according to the second embodiment of the invention.
Figure 6:
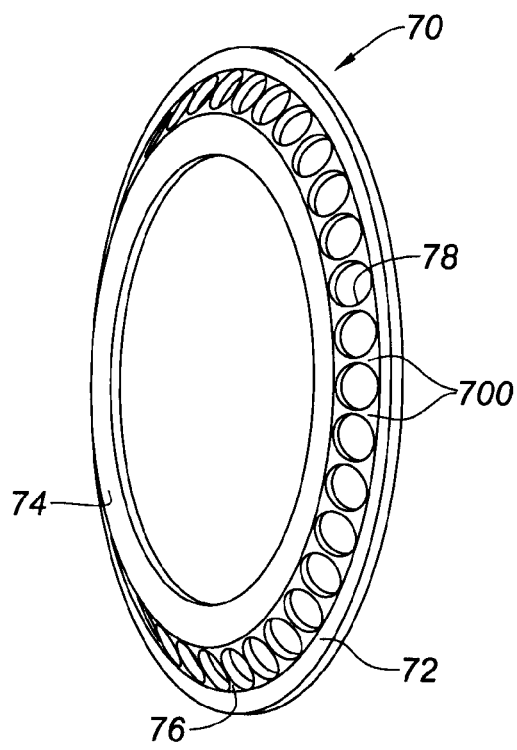
FIG. 6 is a perspective view on a larger scale of a spacer according to a first variant of the second embodiment.
Figure 7:
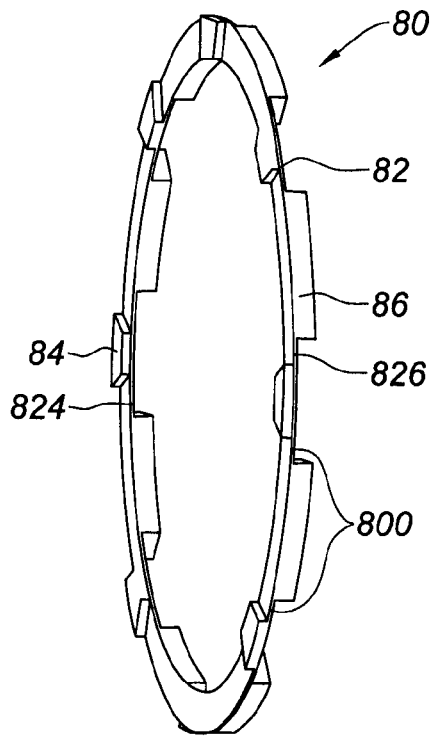
FIG. 7 is a perspective view on a larger scale of a spacer according to a second variant of the second embodiment.

A second embodiment of the second bearing 20 is illustrated in FIGS. 5 to 7. It will be described only in terms of its differences from the first embodiment described above. The inner bearing race 30 is not formed as a single unit but comprises two half-races 36, 38 which are distinct. In normal operation, these two half-races 36, 38 are joined together and maintained against one another by means of a spacer 70, 80 arranged between the second half-race 38 and the axial blocking flange 58. This spacer 70, 80 is designed to deform when the bearing 20 is subjected to a misalignment or a moment above a predetermined value. The deformation of the spacer 70, 80 has the effect of reducing its axial dimension and of moving the second half-race 38 away from the first half-race 36. The second half-race 38 is then displaced axially toward the axial blocking flange 58. According to the first and second variants of the second embodiment, the spacer 70, 80 takes the form of a washer.

According to a first variant of the second embodiment of the second bearing 20 illustrated in FIGS. 5 and 6, the spacer 70 takes the form of a washer which comprises a first rim 72 and a second rim 74 which extend radially on either side of a substantially flat and oblique annular intermediate body 76. The first rim 72 extends radially inward from the intermediate body 76. In service, it is intended to support the spacer 70 against the second half-race 38. The second rim 74 extends radially outward from the body 76. In service, it is intended to support the spacer 70 against the axial blocking flange 58. The intermediate body 76 is pierced with holes 78 which are separated by zones constituting weakness zones 700. When the second bearing 20 is subjected to a misalignment or a moment above a predetermined value, said weakness zones 700 break in tension. The body 76 is crushed and the two rims 72, 74 come to lie substantially in the same plane. The axial dimension of the spacer 70 is thus reduced. As a result, the second half-race 38 is displaced axially in the direction of the axial blocking flange 58.

A second variant of the second embodiment of the second bearing 20 is illustrated in FIG. 7, which shows an alternative spacer 80 to the spacer 70 of the first variant of this same embodiment. In other words, the two spacers 70, 80 are functionally equivalent, and the spacer 80 of the second variant can be substituted for the spacer 70 of the first variant. That is why no figure analogous to FIG. 5 has been presented for this second variant.

According to the second variant of the second embodiment, the spacer 80 takes the form of a washer which comprises a substantially flat annular body 82 from which extend first protrusions 84 and second protrusions 86 which are distributed angularly over said intermediate body 82, on either side thereof. Said first protrusions 84 extend axially from a first face 824 of the intermediate body 82 and are intended to support the spacer 80 against said second half-race 38. Said second protrusions 86 extend axially from a second face 826 of the intermediate body 82 and are intended to support the spacer 80 against the axial blocking flange 58. The first protrusions 84 and the second protrusions 86 are separated by thinner zones which constitute weakness zones 800. When the second bearing 20 is subjected to a misalignment or a moment above a predetermined value, said weakness zones 800 break in bending/shear. The axial dimension of the spacer 80 is thus reduced. The first protrusions 84 and the second protrusions 86 then come to lie substantially in the same plane. As a result, the second half-race 38 is displaced axially in the direction of the axial blocking flange 58.

In FIG. 5, corresponding to the second embodiment of the invention, the outer bearing race 26 consists of two half-races 28, whereas in FIG. 2, corresponding to the first embodiment, the outer bearing race consists of a single unit. These two alternatives are equivalent and have no bearing on the present invention.

Moreover, although not explicitly apparent from FIG. 5, the second embodiment of the arrangement of the second bearing may comprise elastic members 60 analogously to the first embodiment.

Finally, although not explicitly apparent from FIG. 5, the second embodiment of the arrangement of the second bearing may comprise a rotation stop device 62, 64 analogously to the first embodiment.

The invention is not limited to the embodiments and variants which have just been described, but extends to functionally equivalent embodiments and variants which are within the scope of a person skilled in the art.

The invention claimed is:

1. A bearing arrangement for a shaft rotating about an axis, comprising:
    an outer bearing race;
    an inner bearing race including a first half-race fastened to the rotating shaft and a second half-race;
    rolling elements arranged between the outer bearing race and the inner bearing race;
    a maintaining unit which maintains said two half-races together; and
    a retention piece fastened to the rotating shaft and which retains the second half-race,
    wherein said maintaining unit breaks or deforms when the bearing is subjected to a misalignment or a moment above a predetermined value, so as to allow an axial displacement of the second half-race with respect to the first half-race, and
    wherein the retention piece is a piece of revolution which includes a fastening collar which fastens the retention piece to the rotating shaft, a support ring extending circumferentially which radially supports the second half-race after the axial displacement thereof, a conical body which connects the support ring to the fastening collar, and an axial blocking flange extending radially which blocks the second half-race axially after the axial displacement thereof.

2. The bearing arrangement as claimed in claim 1, wherein said two half-races are distinct from one another, and wherein said maintaining unit includes a spacer interposed between the second half-race and the axial blocking flange.

3. The bearing arrangement as claimed in claim 1, further comprising a rotation stop device which prevents a relative rotation of said second half-race with respect to said support ring after separation.

4. The bearing arrangement as claimed in claim 3, wherein said rotation stop device comprises a recess in said support ring and a projection on the second half-race.

5. The bearing arrangement as claimed in claim 1, further comprising at least one elastic member for returning the second half-race toward the first half-race.

6. A turbine engine which comprises at least one bearing arrangement as claimed in claim 1.

7. The bearing arrangement as claimed in claim 1, wherein the axial blocking flange is provided at a downstream end of the support ring.

8. The bearing arrangement as claimed in claim 1, wherein the first half-race includes a race extension, and the race extension and the fastening collar are bolted to the rotating shaft.

9. A bearing arrangement for a shaft rotating about an axis, comprising:
    an outer bearing race;
    an inner bearing race including a first half-race fastened to the rotating shaft and a second half-race;
    rolling elements arranged between the outer bearing race and the inner bearing race; and
    a maintaining unit which maintains said two half-races together,
    wherein said maintaining unit being breaks or deforms when the bearing is subjected to a misalignment or a moment above a predetermined value, so as to allow an axial displacement of the second half-race with respect to the first half-race,
    wherein said maintaining unit includes a connecting annulus interposed between the two half-races and interconnecting the two half-races such that, before separation, the inner bearing race is a single unit, and
    wherein said connecting annulus breaks under tension when the bearing is subjected to a misalignment or a moment above the predetermined value.

10. The bearing arrangement as claimed in claim 9, wherein said connecting annulus is continuous.

11. The bearing arrangement as claimed in claim 9, wherein said connecting annulus is discontinuous.

12. A bearing arrangement for a shaft rotating about an axis, comprising:
    an outer bearing race;
    an inner bearing race including a first half-race fastened to the rotating shaft and a second half-race;
    rolling elements arranged between the outer bearing race and the inner bearing race; and
    a maintaining unit which maintains said two half-races together,
    wherein said maintaining unit being breaks or deforms when the bearing is subjected to a misalignment or a moment above a predetermined value, so as to allow an axial displacement of the second half-race with respect to the first half-race,
    wherein said two half-races are distinct from one another, and wherein said maintaining unit includes a spacer interposed between the second half-race and an axial blocking flange, said axial blocking flange being fastened to the rotating shaft, and wherein said spacer includes a washer with weakness zones which break when the bearing is subjected to a misalignment or a moment above the predetermined value.

13. The bearing arrangement as claimed in claim 12, wherein said spacer comprises:
   a substantially oblique annular body,
   a first rim extending radially inward from said body and intended to support said spacer against said second half-race, and
   a second rim extending radially outward from said body and intended to support said spacer against said axial blocking flange,
   and wherein said body is pierced with holes separated by said weakness zones.

14. The bearing arrangement as claimed in claim 12 or 13, wherein said weakness zones are designed to break in tension.

15. The bearing arrangement as claimed in claim 12, wherein said spacer comprises:
   an annular body,
   first protrusions distributed angularly over said body, extending axially from a first face thereof and intended to support said spacer against said second half-race, and
   second protrusions distributed angularly over said body, extending axially from a second face thereof and intended to support said spacer against said axial blocking flange,
   and wherein said first protrusions and said second protrusions are separated by zones of the body which constitute said weakness zones.

16. The bearing arrangement as claimed in claim 12 or 15, wherein said weakness zones are designed to break in bending/shear.

* * * * *